United States Patent
Cooper et al.

(10) Patent No.: US 8,490,242 B2
(45) Date of Patent: Jul. 23, 2013

(54) MOBILE CASTER

(75) Inventors: Rory A. Cooper, Gibsonia, PA (US); Andrew M. Kwarciak, Nashville, TN (US); Mark A. McCartney, Saxonburg, PA (US); Jonathan Lee Pearlman, Pittsburgh, PA (US)

(73) Assignee: Universit Of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 30 days.

(21) Appl. No.: 12/956,666

(22) Filed: Nov. 30, 2010

(65) Prior Publication Data

US 2011/0162166 A1 Jul. 7, 2011

Related U.S. Application Data

(63) Continuation-in-part of application No. 12/070,939, filed on Feb. 22, 2008, now abandoned.

(60) Provisional application No. 60/903,256, filed on Feb. 23, 2007.

(51) Int. Cl.
*A47L 9/00* (2006.01)
*B60B 33/04* (2006.01)
*A45C 5/14* (2006.01)

(52) U.S. Cl.
USPC .......................................... 16/35 R; 16/18 R

(58) Field of Classification Search
USPC ......... 16/35 R, 35 D, 18 R, 31 R; 403/DIG. 1
See application file for complete search history.

(56) References Cited

U.S. PATENT DOCUMENTS

| | | | |
|---|---|---|---|
| 2,505,852 A * | 5/1950 | Budnick et al. | 16/35 R |
| 2,583,858 A * | 1/1952 | Kostolecki | 16/35 R |
| 4,054,965 A * | 10/1977 | Vig et al. | 16/35 D |
| 4,788,741 A | 12/1988 | Hilborn | |
| 5,347,681 A | 9/1994 | Wattron et al. | |
| 5,727,285 A | 3/1998 | Goman | |
| 5,745,951 A | 5/1998 | Waner | |
| 5,899,469 A | 5/1999 | Pinto et al. | |
| 6,607,250 B2 | 8/2003 | Papac | |
| 6,871,380 B2 * | 3/2005 | Chen | 16/35 R |
| 7,311,329 B2 | 12/2007 | Mulhern | |
| 2007/0134061 A1 * | 6/2007 | Nance | 403/362 |
| 2009/0231095 A1 * | 9/2009 | Gray | 340/5.64 |
| 2009/0315302 A1 * | 12/2009 | Gray | 280/727 |

OTHER PUBLICATIONS

Office Action for U.S. Appl. No. 12/070,939 dated Aug. 5, 2009.

* cited by examiner

*Primary Examiner* — Victor Batson
*Assistant Examiner* — Emily Morgan
(74) *Attorney, Agent, or Firm* — David G. Oberdick; Peter J. Borghetti

(57) ABSTRACT

Caster alignment mechanism having a first component operably connected to a leg of a mobile device and a second component operably connected to a caster of the mobile device. The first and second components are positioned in parallel orientation to each other wherein alignment of the caster with the leg of the mobile device is achieved by the attractive characteristics of the first component with an upper magnet to the second component with a lower magnet. One embodiment of the caster alignment mechanism includes a fixed gap between the upper magnet and the lower magnet for an always engaged or "on" mode. The fixed gap can be adjusted to vary magnetic field strength depending on user specifications for ease of turning. Another embodiment of the caster alignment mechanism includes a switching mechanism to change modes between engaged or "on" mode and disengaged or "off" mode.

4 Claims, 18 Drawing Sheets

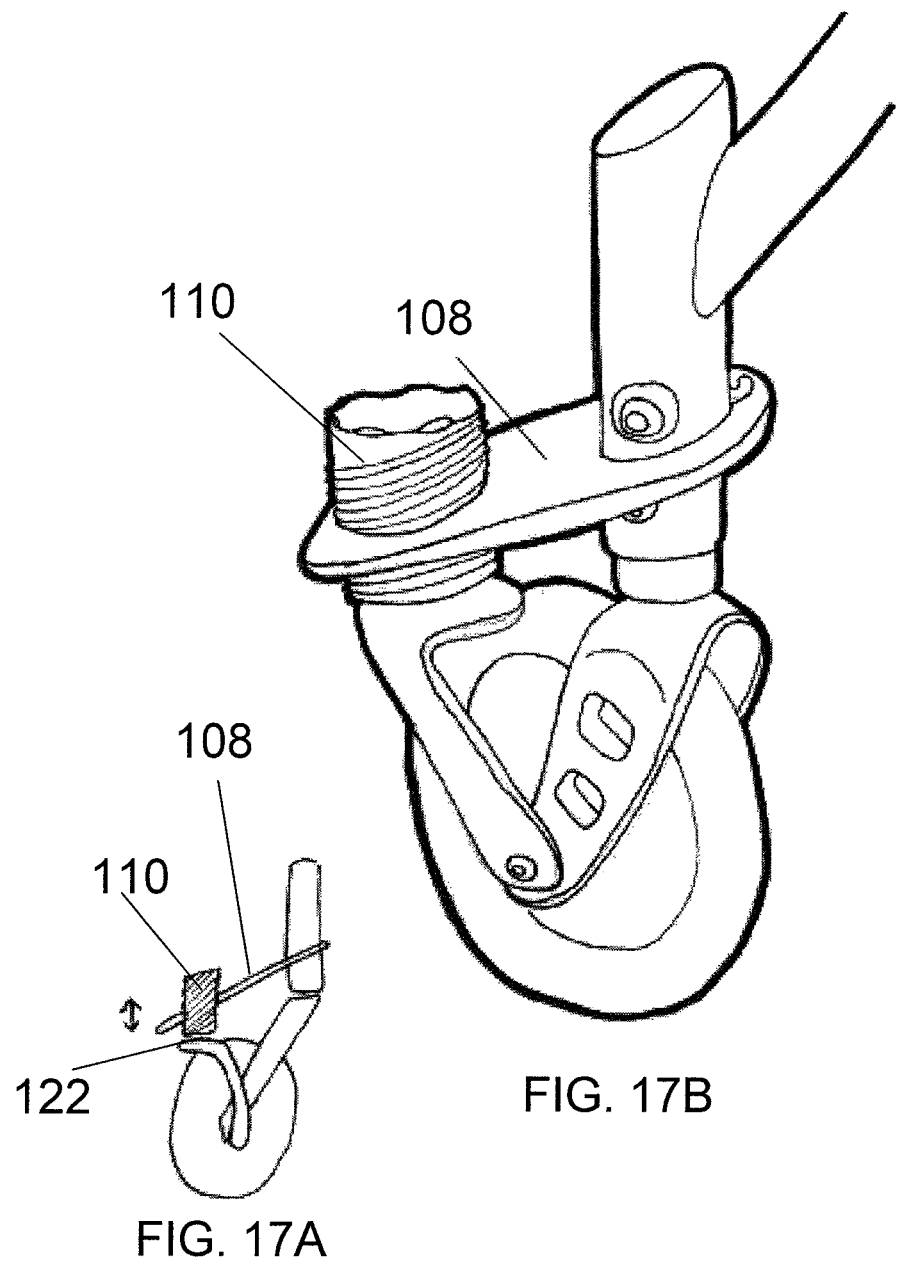

MOBILE CASTER

CROSS-REFERENCE TO RELATED APPLICATIONS

This application is a Continuation in Part application of U.S. Ser. No. 12/070,939, title IMPROVED CASTER AND SYSTEM FOR MOBILE DEVICE, filed on Feb. 22, 2008, which claims priority to U.S. Provisional Application Ser. No. 60/903,256, title IMPROVED CASTER AND SYSTEM FOR MOBILE DEVICE, filed on Feb. 23, 2007, which are both incorporated herein by reference.

STATEMENT REGARDING FEDERALLY SPONSORED RESEARCH OR DEVELOPMENT

The invention was made with government support under grant number B3142C awarded by the Department of Veteran Affairs. The United States Government has certain rights to the invention.

FIELD OF THE INVENTION

This invention relates generally to a caster and caster system for a mobile device and more particularly relates to an improved caster and caster system which prevents caster drift and flutter and otherwise promotes tracking while a mobile device is traversing a side-sloped surface.

BACKGROUND OF THE INVENTION

Wheelchair users constantly encounter difficulties while traversing various terrains during their daily activities. One specific problem a wheelchair user faces is caster drift while traversing side-sloped surfaces. As the wheelchair moves across a side-sloped surface, caster wheels tend to rotate down the slope (see e.g., FIG. 1). The user's downward limb must work very hard to keep the wheelchair climbing the incline or merely traveling straight across the side-sloped surface. This can result in pain or injury to the overworked limb.

It is advantageous to eliminate the great force the user must exert on his or her downward limb for safety reasons. One particular design created for such purposes is U.S. Pat. No. 6,607,250, entitled "Caster block and wheel lock for wheelchair". This reference features a locking mechanism that can be used to eliminate caster wheel rotation. Once engaged, this device locks the caster in the trailing position and fixes the path of the wheelchair. Although this system prevents caster drift, it also severely limits the viability of the caster for indoor use, on uneven surfaces, or in any condition under which regular turning is required. In contrast, the caster and caster system of the present invention allows users to turn the wheelchair or other device and make changes to the path of travel, while the caster is engaged and while still preventing caster drift (see, e.g. FIG. 2, where the path of a device using the caster and caster system of the present invention does not follow the slope).

Outside of the wheelchair realm, delivery persons and others using carts and dollies frequently encounter trouble turning or navigating the related art devices, especially if the devices are heavily loaded. Further, because of caster drift, materials can fall off of the cart or dolly while the user is attempting to maintain a straight course on a sloped surface.

Additionally, consumers frequently encounter wheel flutter in shopping carts because the current caster stems are freely rotating and somewhat loose fitting within the caster mount. This wheel flutter causes the entire cart to shake and/or become difficult to navigate.

The present invention overcomes the disadvantages of the related art as discussed in detail below.

SUMMARY OF THE INVENTION

An object of the caster and caster system of the present invention is to reduce the risk of upper limb pain and injury to wheelchair users by decreasing the forces required to traverse a side-sloped surface. The present invention further prevents caster drift and wheel flutter, by applying a forward or rearward biasing force on the caster wheel, thus lowering the forces required by the downhill limb to maintain a straight path.

Another object of the present invention is to provide a caster biasing mechanism or means that can be retrofitted to an existing caster system of a mobile device such as a wheelchair, cart, shopping cart, or dolly.

Additionally, the caster fork and wheel of the present invention rotate to allow a user to steer the wheelchair, cart, shopping cart, dolly or other mobile device, when necessary, and provide users with a greater degree of control while traversing a side-sloped surface.

Specifically, what is provided is an improved caster and caster system comprising a caster mount attachable to a frame of a mobile device, a caster stem attached to the caster mount and a biasing means for biasing the caster in a desired rotational position. In one embodiment, the biasing means involves having one or more notches defined in the caster stem, and at least one spring plunger, having a ball defined on one end. The ball is biased against the caster stem and situates within the one or more notches to prevent caster drift and flutter and to promote tracking. In this embodiment, an optional disengaging pin can be provided, which slideably engages the one or more notches to disengage the ball from a notch or notches and allow for the free rotation of the caster.

Optionally, magnets located in the caster mount and stem, by using attracting and repelling poles, can also be used to bias the caster stem in a desired location. Other biasing means may also be used.

The caster stem and caster mounts, as modified or retrofitted with the biasing means of the present invention are operable to attach to a standard caster fork and wheel assembly. As such, the improved caster of the present invention is adapted to replace any existing caster on a mobile device.

Caster alignment mechanism having a first component operably connected to a leg of a mobile device and a second component operably connected to a caster of the mobile device. The first and second components are positioned in parallel orientation to each other wherein alignment of the caster with the leg of the mobile device is achieved by the attractive characteristics of the first component with an upper magnet to the second component with a lower magnet. One embodiment of the caster alignment mechanism includes a fixed gap between the upper magnet and the lower magnet for an always engaged or "on" mode. The fixed gap can be adjusted to vary magnetic field strength depending on user specifications for ease of turning. Another embodiment of the caster alignment mechanism includes a switching mechanism to change modes between engaged or "on" mode and disengaged or "off" mode.

Another embodiment of the caster alignment mechanism includes a switching mechanism to change modes between engaged or "on" mode and disengaged or "off" mode. The switching mechanism includes the upper magnet in slideable relationship with a magnet or magnetic material operably attached to a frame of the first component. As the upper magnet is moved away from the lower magnet, the attractive force between the first component and the second component diminishes and the caster is free to draft. As the upper magnet approaches the magnetic frame, the upper magnet is attracted to the first component and is held connected to the first component until the user pushes down the handle connected to the upper magnet.

BRIEF DESCRIPTION OF THE FIGURES

FIGS. 16 and 17A-B are pictorial illustrations of exemplary embodiments showing a gap adjustment mechanism to vary magnetic attractive force strength.

DETAILED DESCRIPTION OF THE PREFERRED EMBODIMENT

The invention will now be described in detail in relation to the preferred embodiments and implementation thereof which is exemplary in nature and descriptively specific as disclosed. As is customary, it will be understood that no limitation of the scope of the invention is thereby intended. The invention encompasses such alterations and further modifications in the illustrated apparatus, system or method, and such further applications of the principles of the invention illustrated herein, as would normally occur to persons skilled in the art to which the invention relates.

As an example of one embodiment and not by limitation, this specification discusses use of the caster and caster system on or for a wheelchair, however, the caster and caster system of the present invention is not limited to such. For example, the caster or caster system can be used on a cart, shopping cart, dolly, or any other similar mobile device having wheels capable of similar attachment. The caster and caster system of the present invention also reduces caster or wheel flutter and otherwise promotes tracking in mobile devices.

Figure 3:
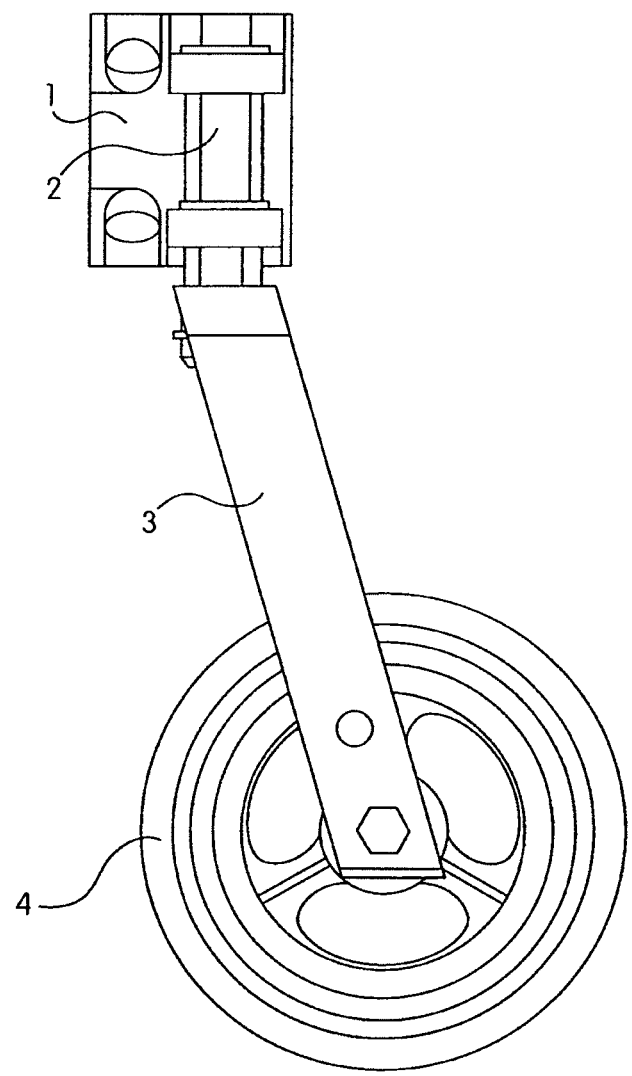
FIG. 3 is a side view of a typical caster system.

For the purposes of this description, and as shown in FIG. 3, a caster is divided into four main components or assemblies, the caster mount 1, the caster stem 2, the caster fork 3, and the wheel 4. The present invention focuses on a biasing means or hardware that can be retrofitted to an existing caster system or incorporated as improvements to the caster mount 1 and caster stem 2. Once assembled, the caster assembly of the present invention can be installed on any wheelchair, shopping cart, cart, dolly or other mobile device that has or is adaptable for detachable caster mounts.

Figure 1:
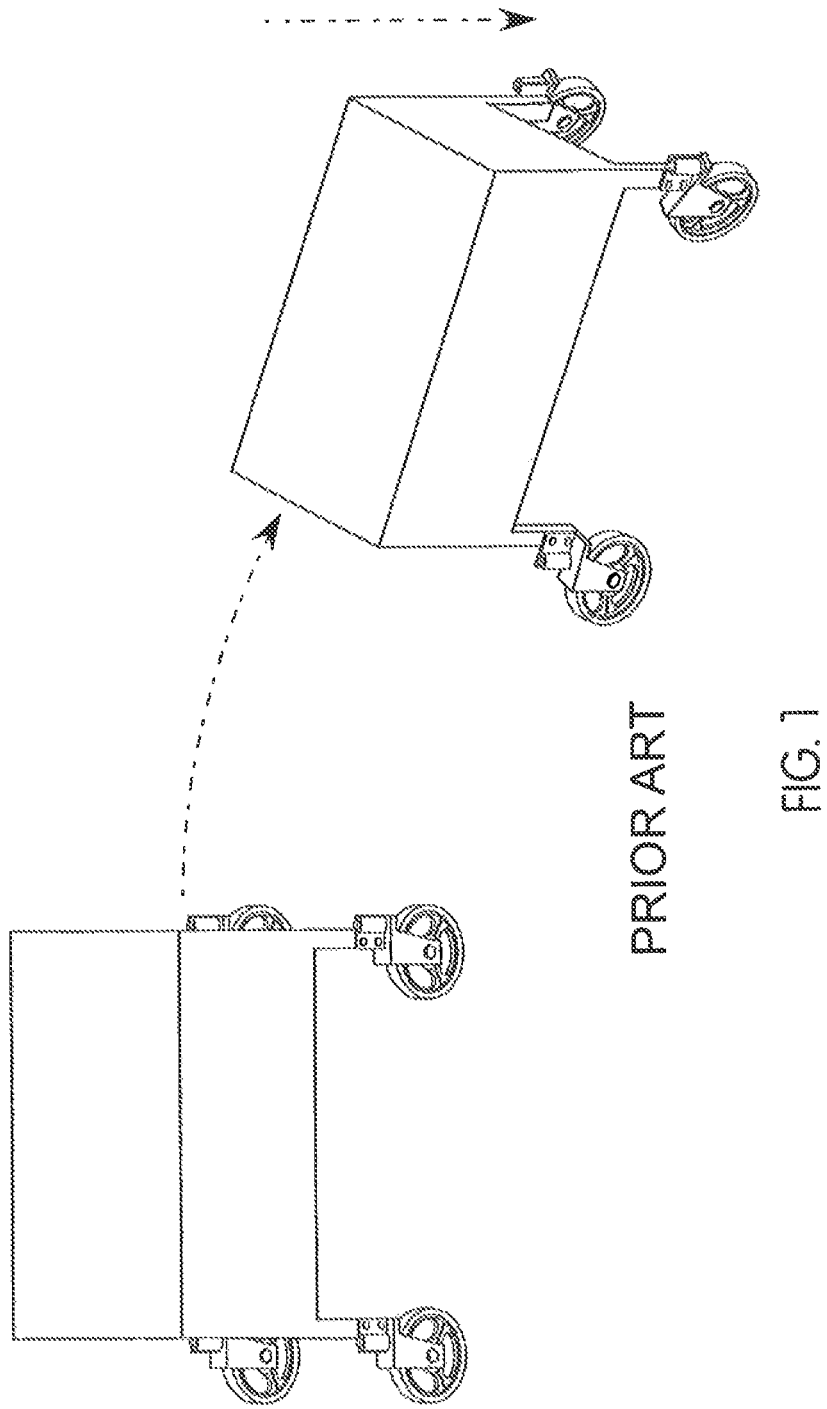
FIG. 1 shows a prior art caster system wherein, caster drift is shown while the wheelchair traverses a side-sloped surface.
Figure 2:
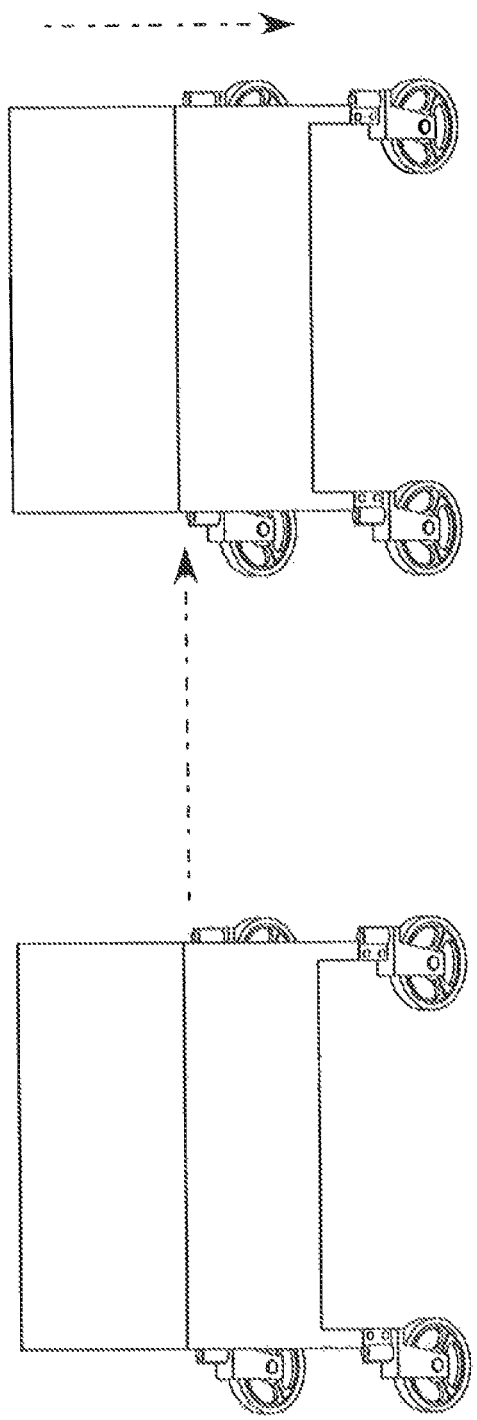
FIG. 2 shows one embodiment of the caster and caster system of the present invention traversing a side-sloped surface without caster drift.

When a wheelchair, shopping cart, cart, dolly or like mobile device traverses a side-sloped surface, the center of mass of the user, cargo, load and/or mobile device, acting about the rear wheels, generates a "moment" on the casters. A "moment" is generally defined as a measure of the torque produced by a force which causes an object to rotate about an axis, which is equal to the force multiplied by the perpendicular distance of the axis from the line of action of the force. This moment causes casters to rotate downhill and causes the mobile device to drift in the same direction (see FIG. 1). As shown in FIG. 2, the caster assembly of the present invention is designed to prevent unwanted caster rotation and/or drift by preferably biasing each caster in the trailing position, that is, when wheel 4 rotates so as to trail behind a mobile device when in motion, and optionally biasing each caster in a leading position (when wheels are facing forward).

Figure 4A:
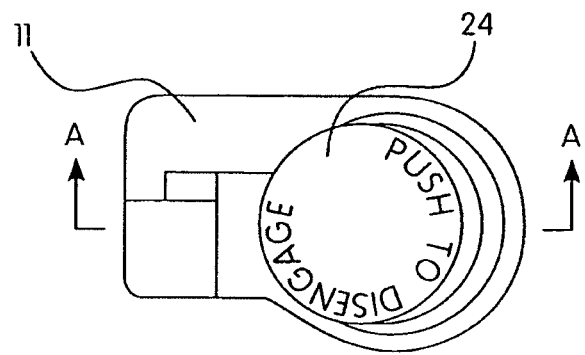
FIG. 4A is a top view of one embodiment of the caster stem and caster mount in the caster system of the present invention.
Figure 4B:
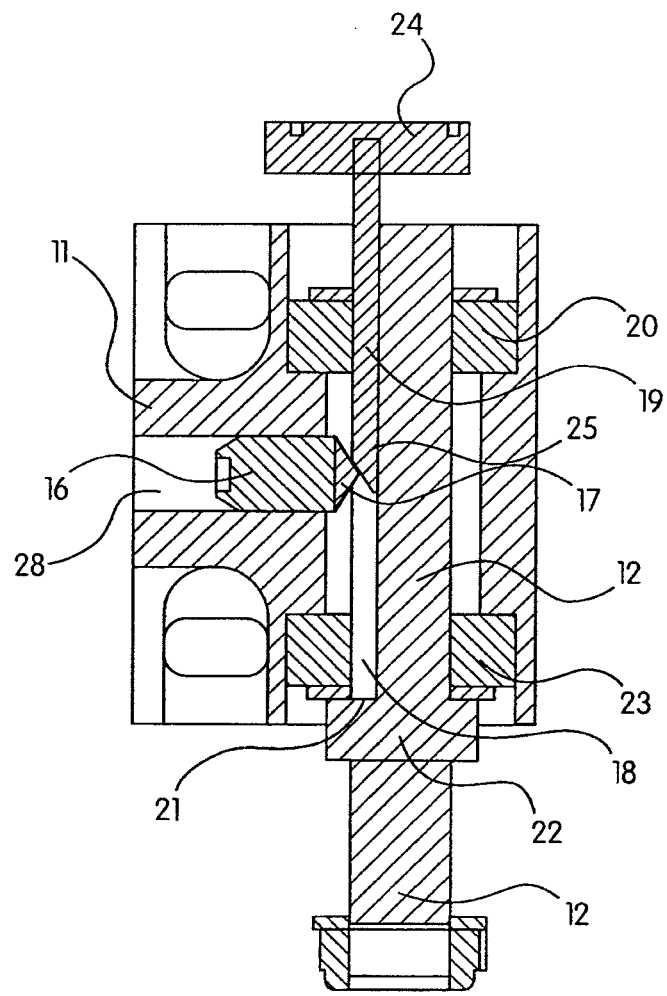
FIG. 4B is a side cut-away view of the caster stem and caster mount along line A-A shown in FIG. 4A.

FIGS. 4A and 4B show one embodiment of the caster mount 11 and caster stem 12 of the present invention. The front of the caster mount housing 15 contains a biasing means in that form of at least one ball-nose spring plunger 16. Optionally, the present invention can use two or more spring loaded ball-nose plungers 16 with the number of spring plungers 16 preferably corresponding to an equal number of notches 18 within caster stem 12. However, in other embodiments, multiple plungers 16 may lie within a single notch 18. For purposes of this description, an embodiment with a single plunger 16 is described, but the invention is not limited to this embodiment. The ball 17 of the spring plunger 16 protrudes into the bored center of the housing and interfaces with the notch 18 in the caster stem 12. A spring 26 within the plunger 16 holds ball 17 into the notch 18 and thereby creates a lateral restriction against caster rotation, wobbling and/or drift. Ball 17 can have varying shapes, including a rounded, angled or pointed surface, provided that the shape of ball 17 is operable to interact with notch 18 to provide the desired lateral restriction against caster rotation, wobbling and/or drift.

The interior of the notch 18 (toward the core of the caster stem 12) is cut and/or fabricated to accept ball 17 in such a manner that rotation of stem 12 causes the sides of notch 18 to exert a force on ball 17 and force it backwards into plunger 16. By way of example, but not limitation, notch 18 can be rounded or V-shaped. Other shapes may also be used. The shape and size of the groove can be varied to provide for different levels of resistance to caster rotation and/or flutter.

Figure 5:
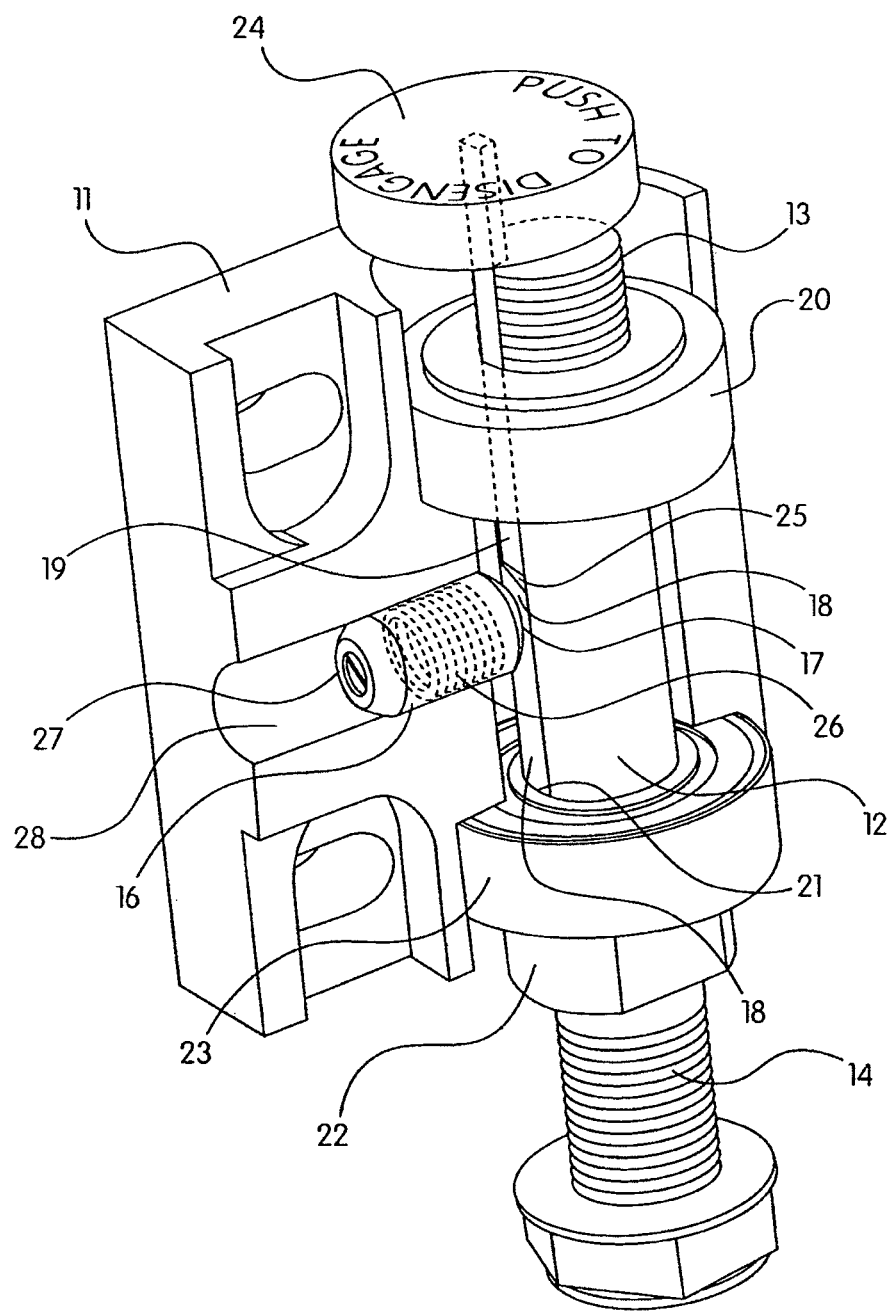
FIG. 5 is a perspective cut-away view of the caster stem and caster of the present invention shown in FIGS. 4A and 4B.

FIG. 5 shows a detailed view of the notch 18 in the caster stem 12. As shown, notch 18 runs lengthwise from about the midpoint 21 of the caster stem 12 and upward to the top of caster stem 12 (i.e., upper thread 13). However, notch 18 can be of a shorter length, so long as it is placed to receive ball 17.

Both of the ends of the caster stem 12 are preferably threaded in one embodiment. The upper thread 13 allows the caster stem 2 to be secured against the bushing 20 in the top of the caster mount 11. The lower thread 14 allows for the attachment of a standard caster fork 3. Just above the lower thread 14, is a bossed, preferably cylindrical section 22. This cylindrical section 22 abuts the bearing 23 in the bottom of the caster mount 11 and serves as an anchor point for attaching the caster fork 3 and for securing the caster stem 12 to the caster mount 11.

In operation, when ball 17 of plunger 16 is fully engaged and caster stem 12 of the present invention begins to rotate, notch 18 in caster stem 12 turns away from ball 17 of the spring plunger 16. As notch 18 initially turns (before full disengagement of ball 17 from notch 18), the surface of the notch 18, opposite the direction of rotation, pushes the ball back towards the spring 26 within the plunger 16. This compresses spring 26 and generates an increased spring force (according to Hooke's Law), which is proportional to the angle of caster stem 12 rotation. The magnitude of the spring force can be adjusted by changing either the strength or stiffness of spring 26 or the position (depth) of the spring plunger 16 within the caster mount housing 11. The latter adjustment can occur, for example, if plunger 16 threadably attaches to cylinder 28 in caster mount 11 and end 27 of plunger 16 is adapted to have a screw head whereby the depth of plunger 16 into notch 18 can be adjusting by screwing plunger 16 inward or outward. Other means of spring adjustment, known to those skilled in the art, are also within scope of the caster and caster system of the present invention. Further, the spring plunger 16 optionally can be replaced with other biasing means known to those skilled in the art.

When ball 17 of spring plunger 16 pushes against the side of the notch 18 upon initial rotation of caster stem 12, the compression force of spring 26 generates a moment about the caster stem 12. This moment increases while ball 17 remains in notch 18 and is forced backward against the spring 26 or other biasing mechanism. This moment or force is opposite in sign to, i.e., resists, the moment generated by the effects of gravity on the center of mass of the user and the wheelchair on a sloped surface. Once the magnitude of the plunger moment matches the magnitude of the moment generated by the center of mass, the caster ceases to rotate. The amount of allowable rotation can be adjusted to meet the request of a specific user or a user's activity. For example, with an increased spring strength and/or increased depth of plunger 16 into notch 18, all caster rotation can be prevented such that the caster and caster system of the present invention serves as a caster lock.

Under normal circumstances, though, the caster and caster system of the present invention allows for at least a minimal amount of rotation to aid in navigation. Where some amount of rotation is intended, the user must overcome the force of the spring 26 or other biasing means that acts to resist caster rotation. In such an embodiment, the ball-nose spring plunger 16 (or other biasing means) is configured to provide just enough force to resist caster drift. By altering the position of the spring plunger 16, the biasing force can be raised or lowered to meet the needs of the user.

Once the caster stem 12 is rotated far enough in either direction, ball 17 exits notch 18, whereby the force of the spring 26 or other biasing means acts directly through the center of the caster stem 12 and no moment is applied to the caster stem 12. This allows the user to turn a mobile device, such as a wheelchair, with only a slight resistance (due to the friction of the ball on the caster stem 12). When a turn is complete and each caster is realigned in the trailing position, the ball 17 reengages the notch 18 in the caster stem 12.

When wheeling indoors or in places where frequent turning is necessary, the forward or rearward bias can be removed from the casters. In the embodiment discussed above, such disengagement can occur by screwing plunger 16 outward so that ball 17 does not rest in notch 18.

In an alternative embodiment of the present invention, disengaging pin 19 (shown in FIGS. 4B and 5) can act to force ball 17 into plunger 16. Disengaging pin 19 fits within notch 18 when it runs the length of stem 12. When push top 24 is pushed downward, the bottom end 25 of disengaging pin 19 disengages the ball 17 of the spring plunger 16 from insertion into notch 18 (i.e., ball 17 is forced into and plunger 16), thereby allowing the caster stem 12 to rotate without lateral restriction and with only limited friction of ball 17 pressing against the outer surface of the caster stem 12. The bottom end 25 of disengaging pin 19 is preferably tapered to gradually push ball 17 of plunger 16 out of and away from notch 18. The push top 24 of the disengaging pin 19 is preferably large, making it easier to handle for users with limited hand function. The top of the disengaging pin 9 can optionally be any other shape or size.

In embodiments with multiple spring plungers 16 and notches 18, a plurality of disengaging pins 19 can be optionally used. The number of disengaging pins 19 is preferably the same as the number of notches 18. Disengaging pin 19 is an optional feature of the present invention, and the caster and caster system of the present invention can function properly with or without the disengaging pin 19.

Other biasing means can also be used, as noted above. For example, in another embodiment, a central rod can run up and down the axle or lie outside the caster stem to create a similar caster bias. This rod interacts with the stem, either directly or indirectly, to prohibit stem rotation when the rod is engaged. Such engagement can occur, for example, when the rod is pushed downward to engage a locking mechanism associated with the rotation of the caster stem.

Figure 6A:
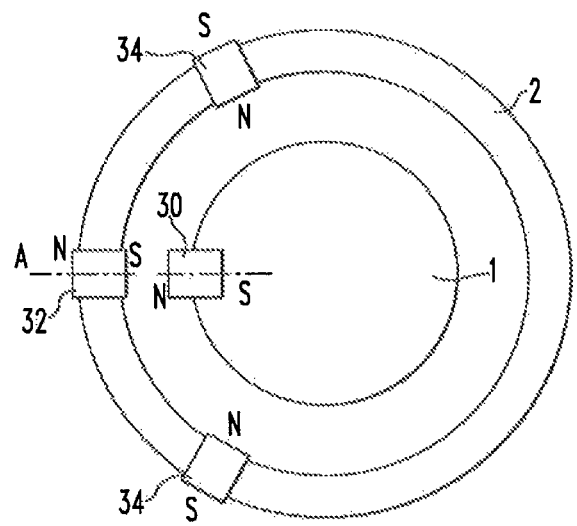
FIG. 6A is an illustration of alternative embodiments of the biasing force mechanism with one pair of magnets and two pair of magnets of the present invention, where the initial magnets are aligned in the desired position A.
Figure 6B:
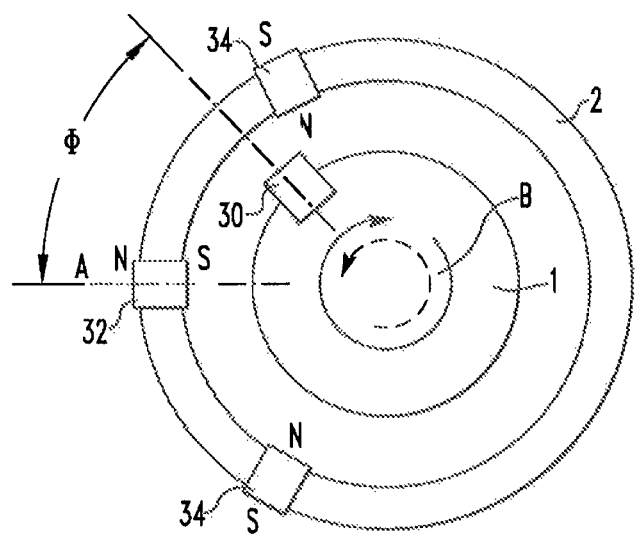
FIG. 6B is an illustration of alternative embodiments of the biasing force mechanism with one pair of magnets and two pair of magnets of the present invention, where one of the initial magnets is not aligned in the desired position A.

In yet another embodiment of the biasing force mechanism of the present invention is illustrated in FIGS. 6A and 6B, the biasing force can be provided magnetically, e.g., by one or two sets of magnets. In particular, one set of magnets 30, 32 can be positioned in the caster stem 2 and the caster housing 1, respectively, such that attracting poles face each other (e.g. the south pole of the housing magnet 32 faces inward and the north pole of the caster magnet 30 faces outward) and are closest when the caster assembly and wheel rotates toward a desired position A (i.e., a trailing or leading position). Another embodiment of the biasing force mechanism includes one magnet and opposing ferrous material. Another embodiment of a magnetic biasing force mechanism can include an additional pair of magnets 34 further positioned in the caster housing 1 on both sides of the initial housing magnet 32 such that like repelling poles face the caster stem 2 (e.g. the north poles of the outer housing magnets face inward). The attraction of the north pole within the caster stem magnet 30 to the south pole in initial housing magnet 32 of the caster housing 2 and the repulsion of the north pole within the caster stem magnet 30 to the north poles of the outer magnets 34 in the caster housing 1 act to provide a further bias B toward a desired position A of the caster assembly and wheel. The strength of the bias is determined by the type, area, and configuration of the magnets in the caster stem 2 and housing 1.

Caster alignment mechanism having a first component operably connected to a leg of a mobile device and a second component operably connected to a caster of the mobile device. The first and second components are positioned in parallel orientation to each other wherein alignment of the caster with the leg of the mobile device is achieved by the attractive characteristics of the first component with an upper magnet to the second component with a lower magnet. One embodiment of the caster alignment mechanism includes a fixed gap between the upper magnet and the lower magnet for an always engaged or "on" mode. The fixed gap can be adjusted to vary magnetic field strength depending on user specifications for ease of turning. Another embodiment of the caster alignment mechanism includes a switching mechanism to change modes between engaged or "on" mode and disengaged or "off" mode.

Figure 7A:
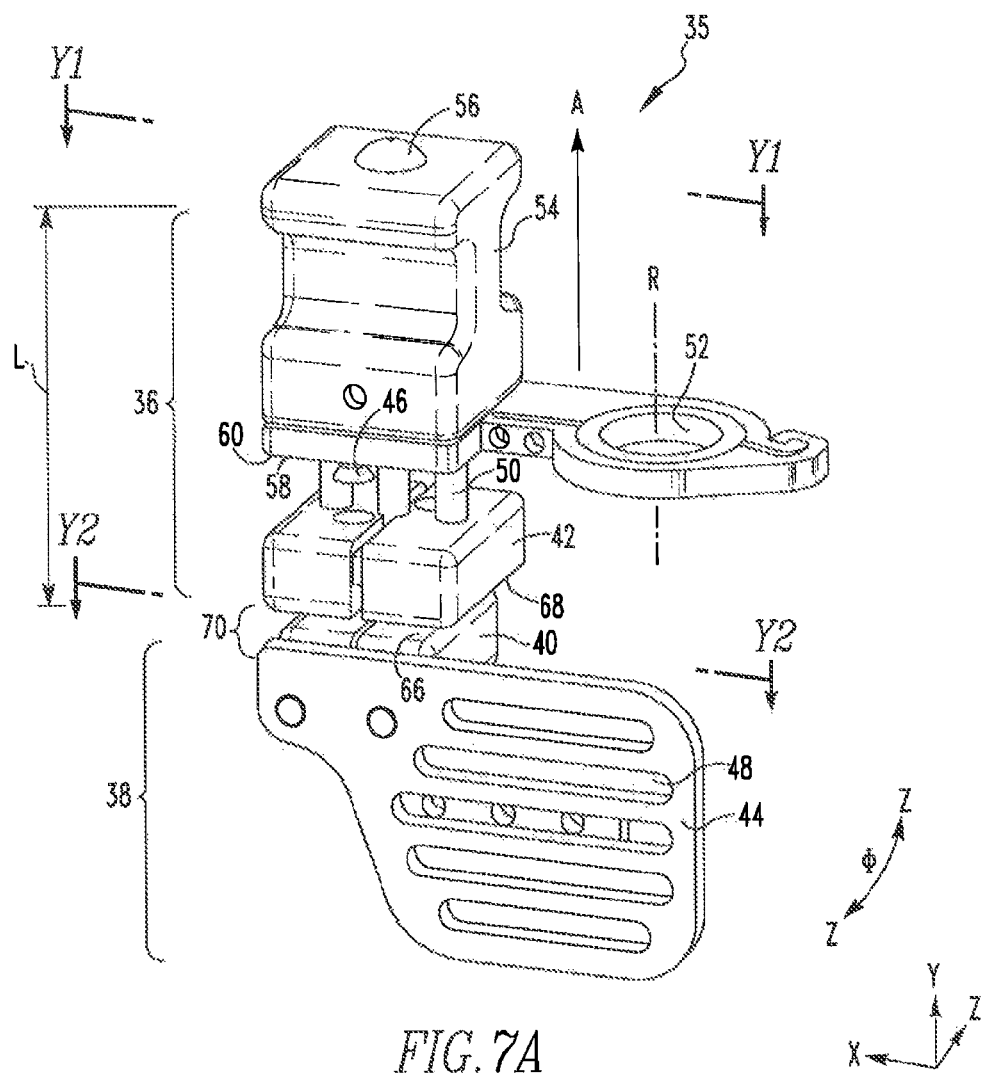
FIGS. 7A-7C are pictorial illustrations of an alternative embodiment of the present invention with a slideable alignment engagement (FIG. 7A) and disengagement (FIG. 7B) mechanism.
Figure 7B:
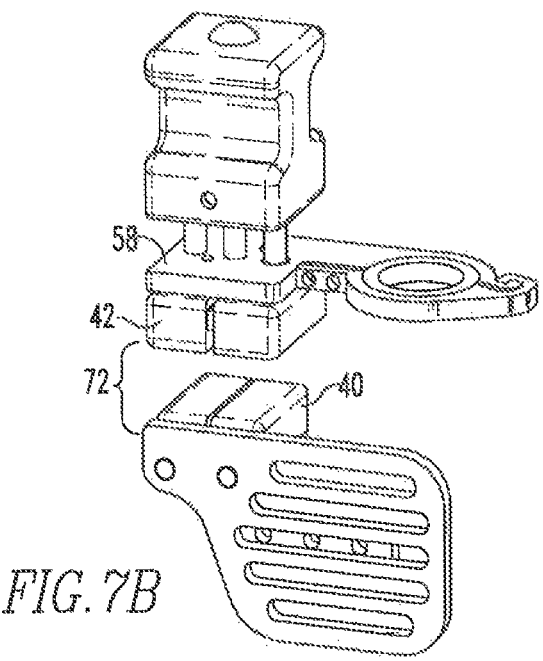
Figure 7C:
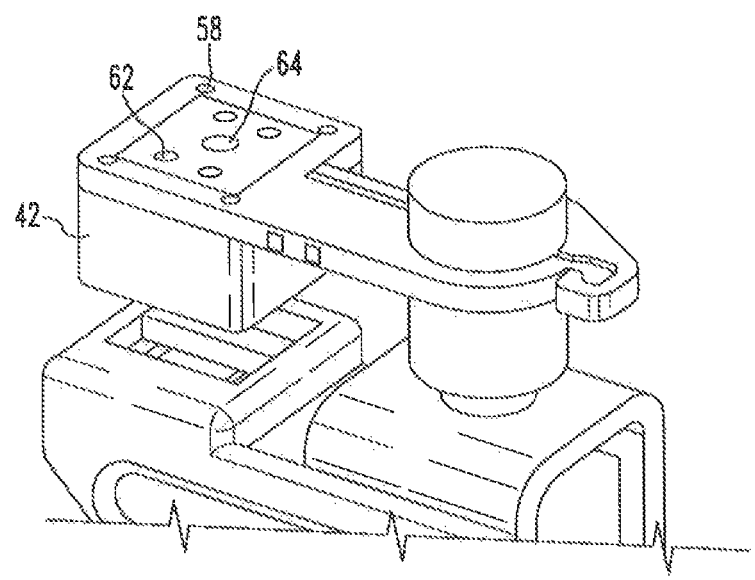

Now turning to FIGS. 7A-7C that illustrate an exemplary embodiment of the present invention with a slideable magnetic alignment engagement (FIG. 7A) and disengagement (FIG. 7B) mechanism 35 that can be attached to a mobile device, such as a wheelchair. Slideable magnetic alignment mechanism 35 comprises an upper component 36 attachable to the barrel or leg of the wheelchair and a lower component 38 attachable to a fork of a caster. Upper component 36 comprises an upper plate 58 having a clamp 52 that attaches to any diameter barrel or leg of the wheelchair. Clamp 52 can include a Delrin insert to allow same clamp to be used form a variety of barrel diameters. Upper component 36 can include a handle 54 and upper magnet 42 being connected by shoulder bolts 50. Plate 58 is disposed between handle 54 and upper magnet 42. Plate 58 can be made of a magnetic material or have attached thereto a magnetic device, such as a bolt or screw 46, in proximity to plate bottom surface 60 such that when upper magnet 42 is positioned in proximity of plate bottom surface 50, then upper magnet 42 becomes attracted to plate 58 or magnetic device 46 to hold upper magnet 42 away from lower magnet 40 of lower component 38 in a disengaged position as shown in FIG. 7B. Handle 54, upper magnet 42, and shoulder bolts 50 (straight or tapered) form a single component being in slideably orientation with plate 58. Shoulder bolts 50 slide within holes 62 (FIG. 7C). Threaded bolt 56 engages with upper magnet 42 to adjust height of lower surface 68 of upper magnet 42 relative to upper surface 66 of lower magnet 40. Lower components 38 include lower magnet 40 attached to lower plate 44. Lower plate 44 can include cut out longitudinal slots 48 or holes (not-shown) to attach to a variety of forks by bolting through complementary cut out longitudinal slots or holes in fork or referencing against the side of the fork. Upper surface 66 of lower magnet 40 is oriented substantially parallel with lower surface 68 of upper magnet 42 to form gap 70 therebetween. There is always a gap directly between upper surface 66 of lower magnet 40 and lower surface 68 of upper magnet 42 without any structure or component contacting surfaces 66, 68 to hold or form perpendicular gap 70 such that the entire surface areas A1, A2 (not shown) of upper surface 66 of lower magnet 40 and lower surface 68 of upper magnet 42, respectively, are not obstructed for efficient attractive forces. The gap can vary from it minimum perpendicular gap 70 (FIG. 7A) at the engaged or "on" position to its maximum perpendicular gap 72 (FIG. 7B) at its disengaged or "off" position. Lower magnet 42 can be one or more magnets. Lower magnet 42 can slide from side-to-side to center magnets regardless of fork width.

First component 36 and second component 38 have a common rotational axis R. First component 36 includes a center plane Y1 that includes the common rotational axis R. Second component 38 includes a center plane Y2 that includes the common rotational axis R. Plane Y1 and plane Y2 are in a common plane when first component 36 and second component 38 are substantially aligned for a straight path (see FIG. 2). Second component 38 is capable of rotating in direction Z about the common rotational axis R relative to first component 36 to form an angular displacement Ø (see FIG. 6B) between center plane Y1 of first component 36 and center plane Y2 of second component 38 while maintaining the perpendicular gap 70 between upper magnet 42 and lower magnet 40. The attractive forces between upper magnet 42 and lower magnet 40 will cause second component 38 to be pulled back to zero angular displacement (see FIG. 6A).

Perpendicular Gaps 70, 72 can be set in many ways known to one of skill in the art. An embodiment of the present invention sets the gap by either adjusting upper magnet 42 by clamping 52 to the diameter barrel or leg of the wheelchair at different vertical locations while maintaining lower plate 44 in a fixed vertical position on a fork. Another embodiment of the present invention set the gap by adjusting lower magnet 40 by positioning lower plate 44 at different vertical positions on the fork while maintaining lower plate 44 in a fixed vertical position with clamp 52 at a predetermined diameter barrel or leg of the wheelchair. Another embodiment of the present invention adjusts both clamp 52 and lower plate 44 to position upper surface 66 of lower magnet 40 relative to lower surface 68 of upper magnet 42. As mentioned above, threaded bolt 56 can engage with upper magnet 42 to adjust height of lower surface 68 of upper magnet 42 either increasing or decreasing length L of component 36, thereby adjusting the gap between upper surface 66 of lower magnet 40 and lower surface 68 of upper magnet 42. The attractive force of the lower magnet 40 to the upper magnet 40 eliminates caster drift (see FIG. 1) causing lower magnet 40 to be pulled back into alignment with upper magnet 42 as lower magnet 42 is moved left or right away from upper magnet 40.

The caster alignment mechanism includes a switching mechanism to change modes between engaged or "on" mode and disengaged or "off" mode. One embodiment of the switching mechanism comprises the upper magnet 42 connected to a handle 54 in slideable relationship with a polar opposite magnet or magnetic material 46 operably attached to a frame 58 of the first component 36, such that the system is in the disengaged or "off" mode when an attractive force between the upper magnet 42 and the frame magnet 58 is stronger than the attractive force between the upper magnet 42 and the lower magnet 40. As the upper magnet 36 is moved away from the lower magnet 40, the attractive force between the first component 36 and the second component 38 diminishes and the caster is free to draft. Upper magnet 42 is held in the disengaged or "off" mode by the an attractive force between the upper magnet 42 and the frame magnet 58 until the user pushes down the handle 54 connected to the upper magnet 42 by one or more rods 50 (straight rods).

Another embodiment of the switching mechanism comprises the upper magnet 42 connected by one or more tapered rods 50 to a handle 54. Frame 58 is disposed between the upper magnet 42 and the handle 54. Frame 58 includes one or more holes 62 to partially receive the one or more rods 50 for a slideable relationship with the upper magnet 42 and the frame 58. The one or more rods 50 include a decreasing taper from the upper magnet 42 to the handle 54, where the diameter of the rod in proximity to the upper magnet is larger than a diameter of one or more holes 62 of frame 58 to cause an interference fit between the one or more rods 50 and the one or more holes 62 of the frame when handle 54 is pulled upward (direction A) and the upper magnet 42 moves toward the frame 58. Upper magnet 42 is held in the disengaged or "off" mode by the interference fit until the user pushes down the handle 54 connected to the upper magnet 42 towards lower magnet 40.

Figure 8:
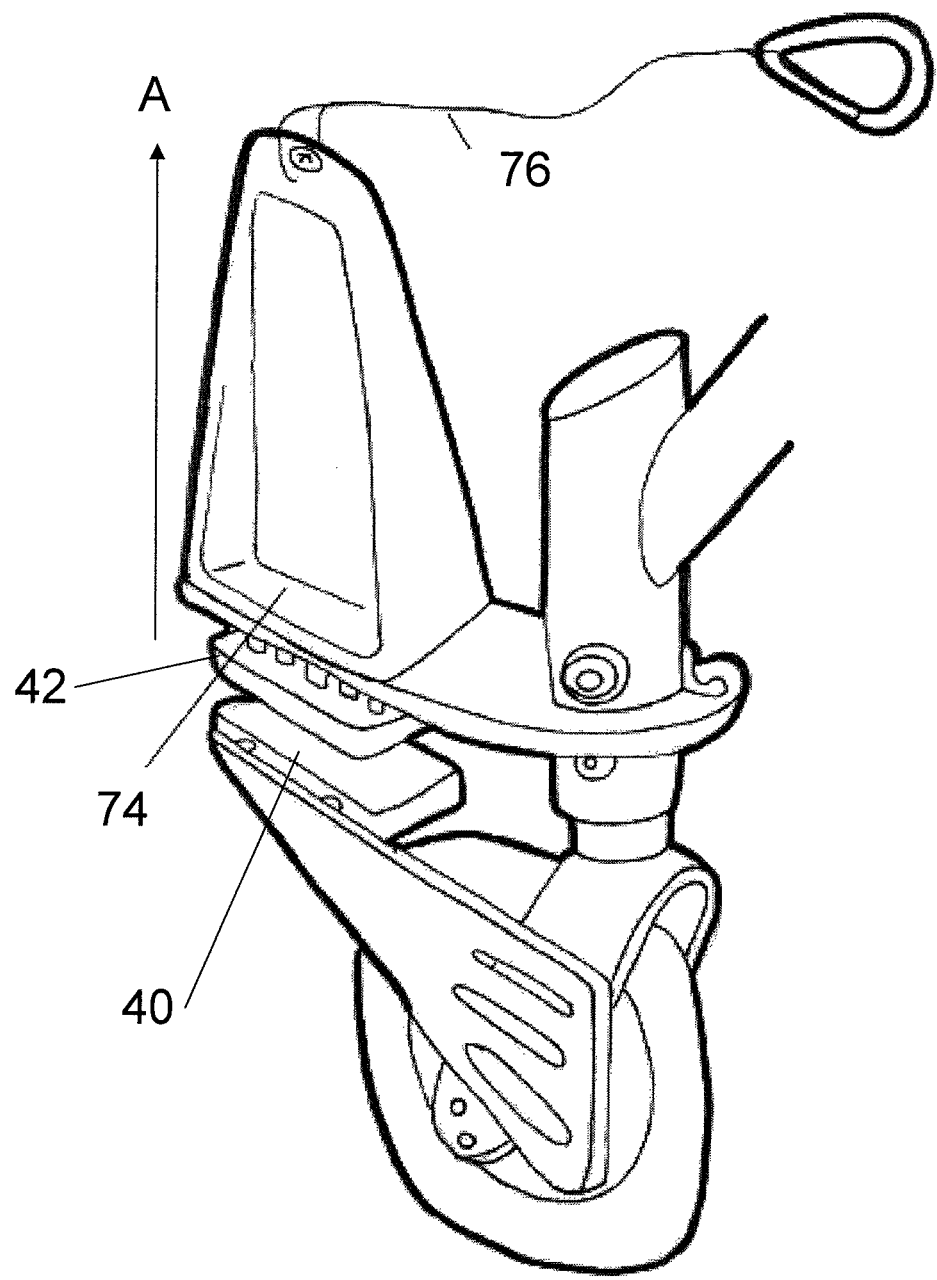
FIGS. 8-12 are pictorial illustrations of other alternative embodiments of the present invention with slideable alignment engagement mechanisms shown in the engagement position (down) capable of being disengaged when mechanism moved in A direction (upward)
Figure 9:
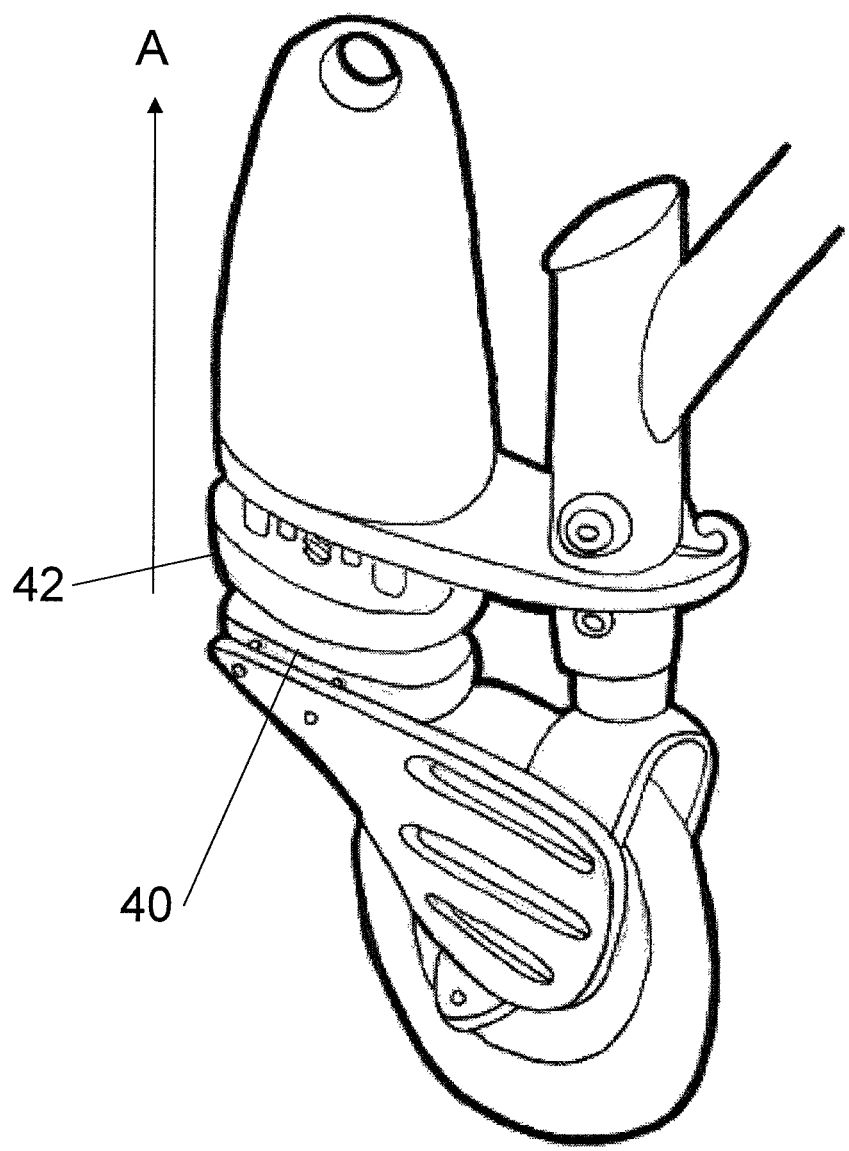
Figure 10:
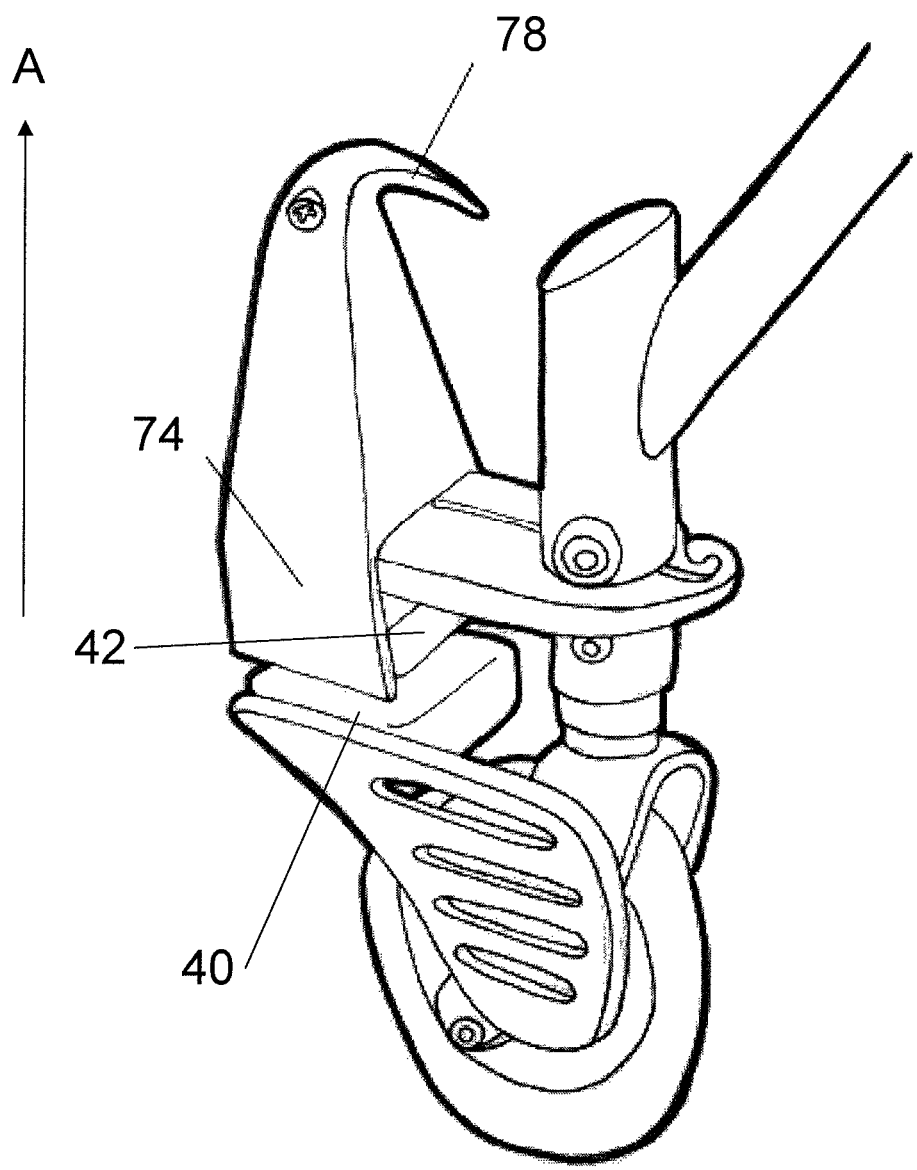
Figure 11:
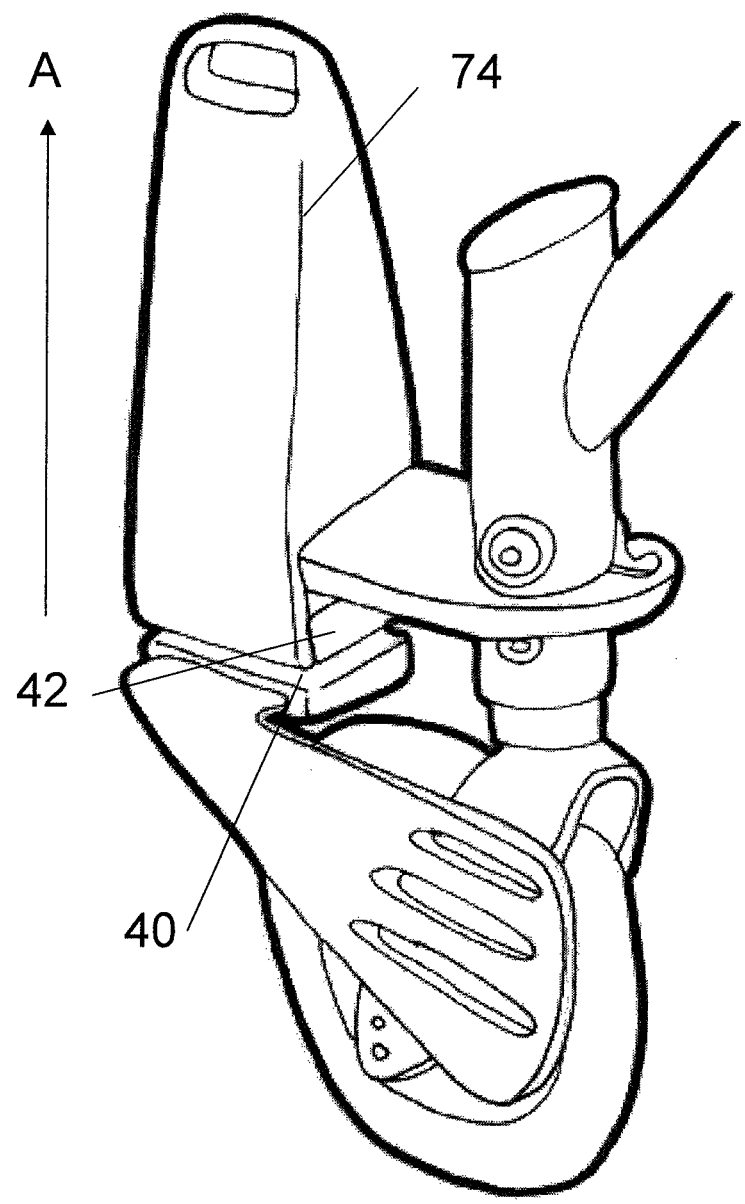

FIGS. 8-11 are pictorial illustrations of other alternative embodiments of the present invention with slideable alignment engagement mechanisms shown in the engagement or "on" position (down) capable of being disengaged or "turn off" when handle 74 moved in A direction (upward). FIGS. 8-10 illustrate handle 74 used for moving upper magnet 42 away from lower magnet 40 to go from engagement or "on" mode to disengaged or "off" mode. FIG. 8 illustrates a pull string 76 that can be used to move handle 74 from the engagement or "on" mode to disengaged or "off" position. FIG. 10 illustrates a contoured or tapered handle portion 78 to move handle 74 from the engagement or "on" mode to disengaged or "off" position.

Figure 12:
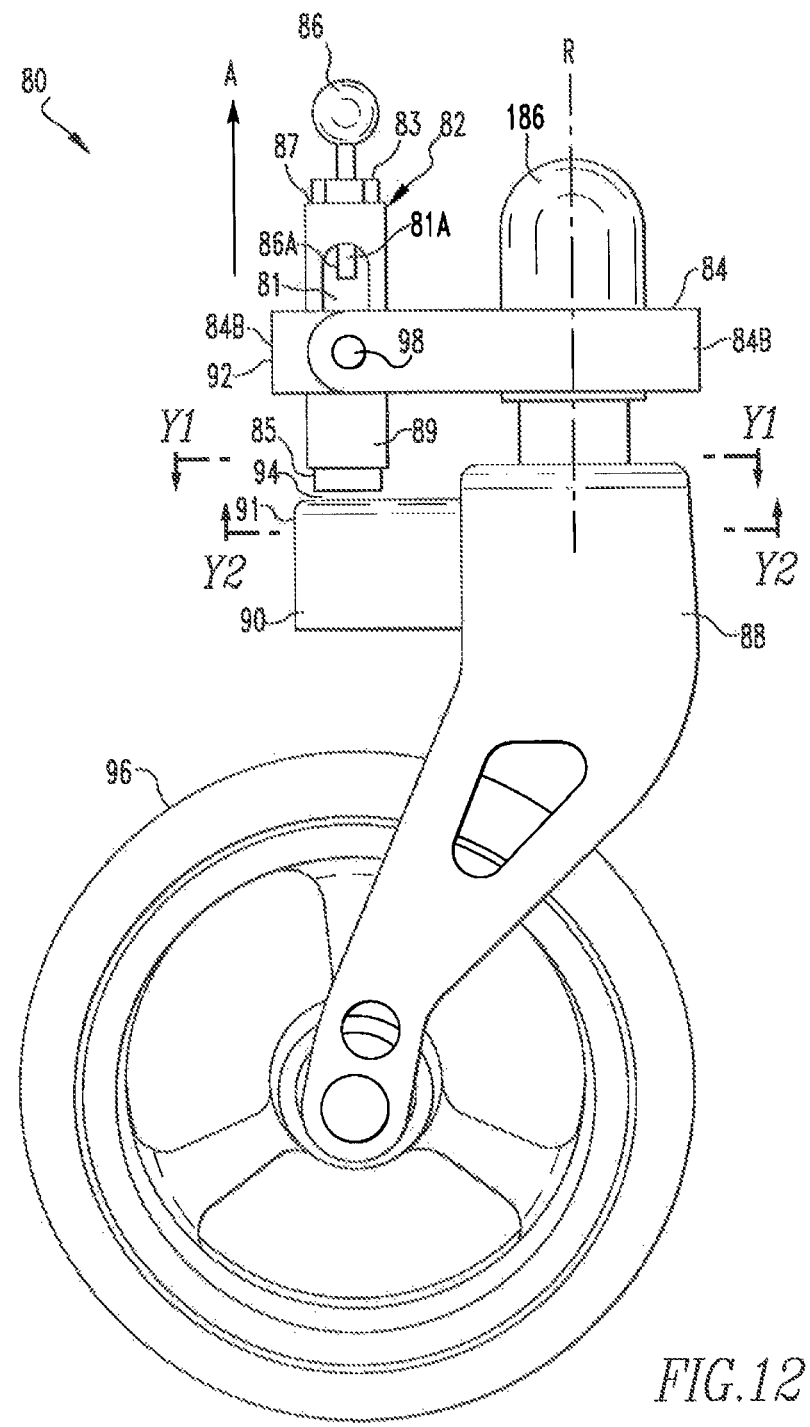

FIG. 12 illustrates another embodiment of the magnetic alignment system 80 having an engagement ("on") (as shown in FIG. 12) and disengagement mechanism ("off"). Similar to the embodiments discussed above having two components: a first component 82 attaches to the barrel 86 or leg of a wheelchair and a second component 90 attaches to fork 88 that is rotational connected to caster wheel 96. First component 82 includes threadable handle 86 that can be secured in housing 87 by nut 83, magnet 85 disposed at end 89 of housing 87 opposing handle 86, and collar 84 being slideably secured to barrel 86 at one end 84a and through bore 92 at end 84b sized to slideably received housing 87. Housing 87 includes elongated slot 81 and collar 84 included bolt 98. Housing 87 is limited in its longitudinal travel by bolt 98 contacting slot ends 81A and 81B (not shown). Housing 87 longitudinal travel can be further limited by threaded handle 86 contacting bolt 98 at one end and upper magnet 85 contacting bolt 98 at the opposing end. Threaded handle 86 has a length that can be adjusted within housing 87 to determine the longitudinal displacement of housing 87 within bore 92 such that end 86a of handle 86 contacts bolt 98 to stop magnet 85 downward travel. Second component 90 with embedded lower magnet 91 is connected to fork 88. Gap 94 is formed between upper magnet 85 and lower magnet 91, which is set by adjusting handle 86 as discussed above. FIG. 12 illustrates gap 94 in the engaged or "on" position. User will disengage the magnetic alignment system 80 by pulling up handle 86 in direction A. First component 82 will be locked or retained in its disengaged or "off" position by the attractive forces of upper magnet 85 to bolt 98.

Figure 13:
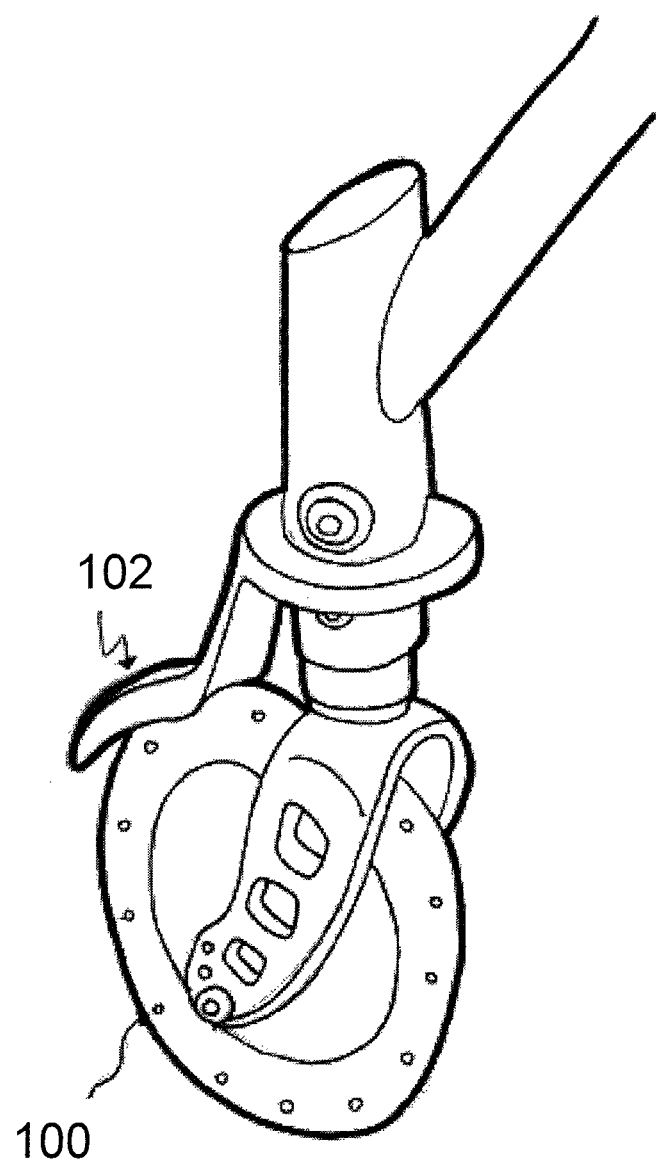
FIG. 13 is a pictorial illustration of yet another alternative embodiment of the present invention having an adjustable, fixed gap between a magnet embedded in the caster wheel and an attractive magnet attached to the mobile device frame.

FIG. 13 is a pictorial illustration of yet another alternative embodiment of the present invention having an adjustable, fixed gap between a ferrous metal embedded 100 in the caster wheel and an attractive magnet 102 attached to the mobile device frame. This configuration is always in the engaged or "on" position.

Figure 14:
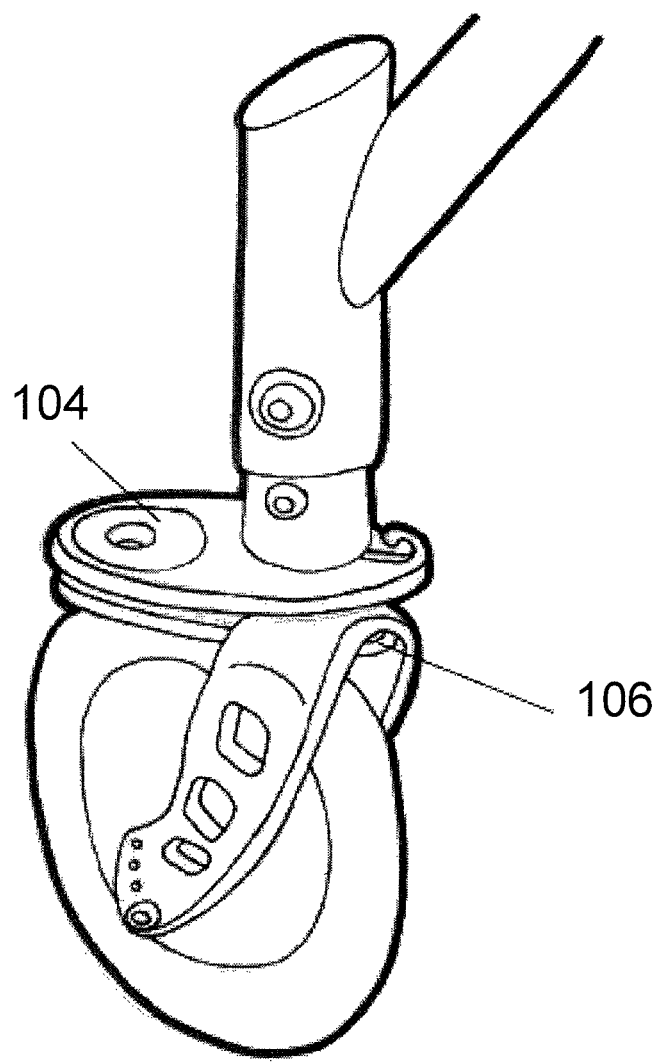
FIGS. 14-15 are pictorial illustrations of yet other embodiment of the present invention having an adjustable, fixed gap between a magnet attached to the caster wheel fork and an attractive magnet attached to the mobile device frame.
Figure 15:
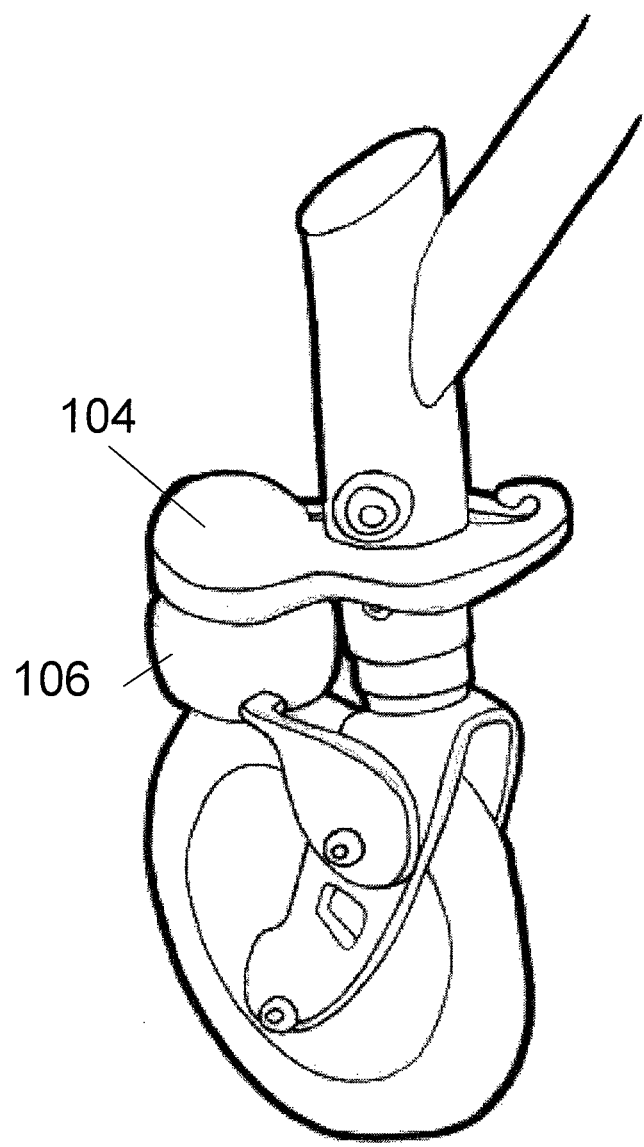
Figure 16:
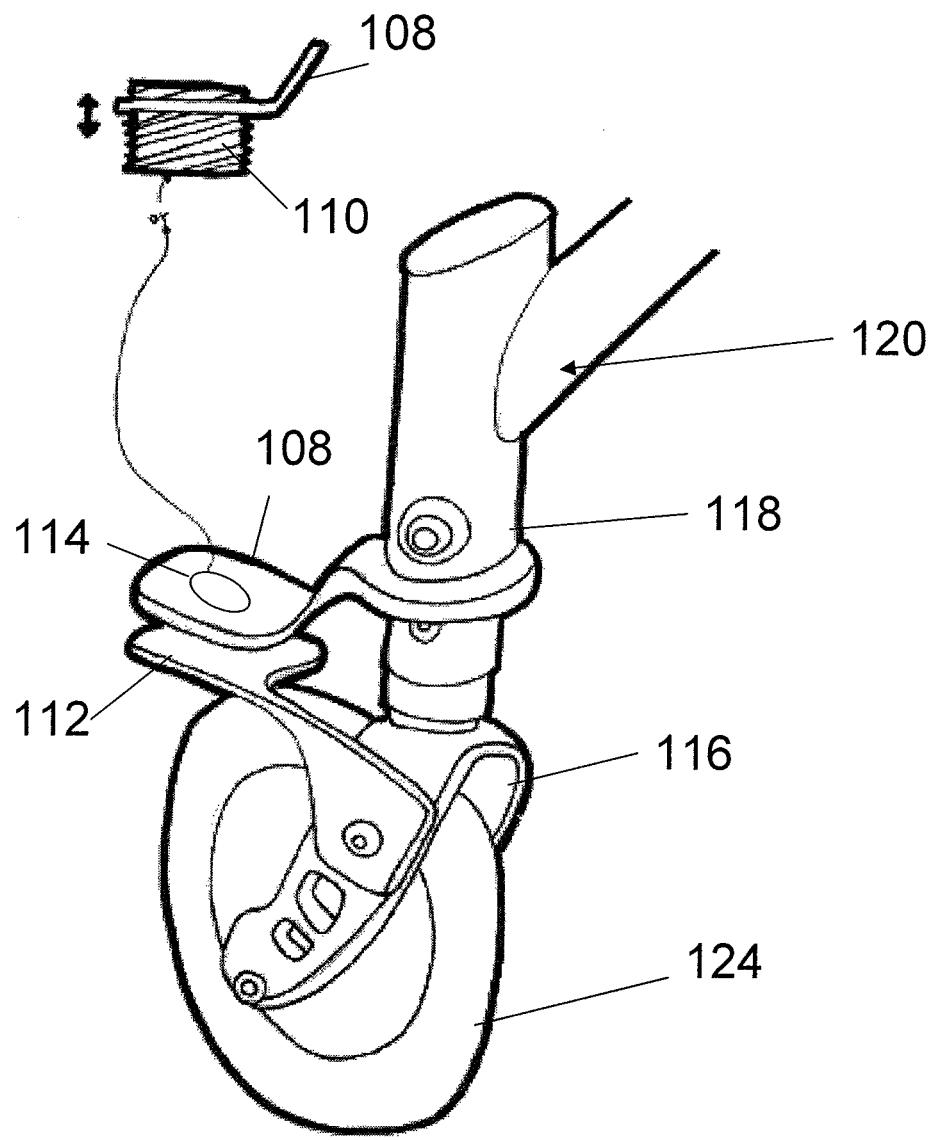

FIGS. 14-15 are pictorial illustrations of yet other embodiment of the present invention having an adjustable, fixed gap between a magnet 106 attached to the caster wheel fork and an attractive magnet 104 attached to the mobile device frame; and FIGS. 16 and 17A-B are pictorial illustrations of exemplary embodiments showing a gap adjustment mechanism to vary magnetic attractive force strength. Wheelchair 120 having barrel 118 with pivotally connected fork 116 and caster wheel 124 include lower magnet 112 attached to fork 116 and upper magnet 110 connected to barrel 118. Magnet 110 can be threaded and screwed into hole 114 of angle barrel piece 108. Gap 122 (FIG. 17A) can be adjusted by screwing threaded upper magnet 110 into and out of hole 114 of angle barrel piece 108. Also, gap 122 can be adjusted by positioning angle barrel piece 108 upward or downward on barrel 118. Also, gap 122 can be adjusted by a combination of the above disclosed methods.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. An caster alignment system of a mobile device having a fork rotationally connected to a leg of the mobile device, wherein the caster alignment system comprises:
   a first component operably connected to the leg of the mobile device, wherein the first component includes:
      a housing having a first end, a second end, a longitudinal through-bore from the first end to the second end forming a sidewall, and an elongated slot through the sidewall extending longitudinally between the first end and the second end;
      a threadable handle having an end disposable in the longitudinal through-bore of the housing through the first end of the housing, wherein the threadable handle is secured in the first end of the housing, an upper magnet disposed at the second end of the housing opposing the threadable handle;
      a collar having a through-bore at one end sized to slideably receive the housing;
      a bolt secured to the one end of the collar and disposed through the elongated slot of the housing such that the end of the threadable handle contacts the bolt as the housing slideably travels longitudinally downward to define an "on" mode and the upper magnet contacts the bolt as the housing slideably travels longitudinally upward to define an "off" mode, wherein the bolt retains the upper magnet to the bolt when the upper magnet is in proximity of the bolt; and
   a second component operably connected to the fork of the mobile device, wherein the second component comprises a lower magnet on its upper surface,
   wherein the first and second components are positioned in parallel orientation to each other to form a perpendicular gap between the upper magnet of the first component and the lower magnet of the second component, wherein the magnetic properties of the lower magnet of the second component are a polar opposite of the magnetic properties of the upper magnet of the first component,
   wherein alignment of a caster rotatably connected to the fork of the mobile device is achieved by an attractive force of the upper magnet of the first component to the lower magnet of the second component when the caster is caused to deviate from a straight path when the caster alignment system is in the "on" mode.

2. The caster alignment system according to claim 1, wherein the first component and the second component have a common rotational axis R, wherein the first component includes a center plane Y1 that includes the common rotational axis R, wherein the second component includes a center plane Y2 that includes the common rotational axis R, wherein the plane Y1 and the plane Y2 are in a common plane when the first component and the second component are substantially aligned for a straight path, wherein the second component is capable of rotating about the common rotational axis R relative to the first component to form an angular displacement between the center plane Y1 of the first component and the center plane Y2 of the second component while maintaining the perpendicular gap between the upper magnet and the lower magnet.

3. The caster alignment system according to claim 1, wherein the gap is formed without any structural member disposed between the lower surface of the first component and the upper surface of the second component.

4. The caster alignment system according to claim 1, wherein the attractive force between the upper magnet and the lower magnet can be adjusted by varying the gap size depending on user specifications for ease of turning.

* * * * *